United States Patent [19]

Hayakawa et al.

[11] Patent Number: 5,244,977
[45] Date of Patent: Sep. 14, 1993

[54] PROCESS FOR PREPARING RUBBER-MODIFIED STYRENE RESINS

[75] Inventors: Akifumi Hayakawa, Kitakyushu; Masanari Fujita, Kimitsu; Hiroyuki Shibata; Yoshitaka Sakamaki, both of Kisarazu, all of Japan

[73] Assignee: Nippon Steel Chemical Co., Ltd., Tokyo, Japan

[21] Appl. No.: 601,773

[22] PCT Filed: Mar. 9, 1990

[86] PCT No.: PCT/JP90/00309

§ 371 Date: Oct. 31, 1990

§ 102(e) Date: Oct. 31, 1990

[87] PCT Pub. No.: WO90/10656

PCT Pub. Date: Sep. 20, 1990

[30] Foreign Application Priority Data

Mar. 10, 1989 [JP] Japan .................. 1-56197
Mar. 15, 1989 [JP] Japan .................. 1-60630

[51] Int. Cl.$^5$ .................. C08F 2/02; C08F 2/06
[52] U.S. Cl. .................. 525/243; 525/263; 525/265; 525/316
[58] Field of Search .................. 525/243, 263, 265, 316

[56] References Cited

U.S. PATENT DOCUMENTS

| | | | |
|---|---|---|---|
| 4,098,847 | 7/1978 | Stevenson et al. | 525/243 |
| 4,221,883 | 9/1980 | Mott et al. | 525/244 |
| 4,640,959 | 2/1987 | Alle | 525/243 |
| 4,876,312 | 10/1989 | Meister et al. | 525/316 |

FOREIGN PATENT DOCUMENTS

| | | |
|---|---|---|
| 47-7343 | 3/1972 | Japan . |
| 57-164106 | 10/1982 | Japan . |
| 61-143414 A | 7/1986 | Japan . |
| 63-118315 A | 5/1988 | Japan . |
| 63-118346 | 5/1988 | Japan . |
| 63-1139009 A | 5/1988 | Japan . |
| 63-162713 A | 7/1988 | Japan . |
| 1165052 | 9/1969 | United Kingdom . |

*Primary Examiner*—John Kight, III
*Assistant Examiner*—Rabon Sergent
*Attorney, Agent, or Firm*—Armstrong, Westerman, Hattori, McLeland & Naughton

[57] ABSTRACT

A feed containing 100 parts by weight of reactants consisting of 88 to 98% by weight of a styrene-based monomer or its mixture with other comonomers and 2 to 12% by weight of high-viscosity rubber with a viscosity of 400 to 2,000 centipoises in a 5% by weight styrene solution at 25° C., 0.01 to 0.2 part by weight of an organic peroxide, and 0 to 30 parts by weight of an inert organic solvent is supplied continuously to the first complete mixing type reactor where it is polymerized under the condition prevailing before the rubber phase inversion, the initial reaction mixture is withdrawn continuously and supplied to the second complete mixing type reactor where the rubber is transformed into particles with the conversion of the monomers in the reactants held at 40% by weight or less, and the conversion is raised in the following reactor to yield impact-resistant rubber-modified styrene resins containing rubber particles with a weight average particle diameter of 1.5 to 4 $\mu$m.

3 Claims, 1 Drawing Sheet

PROCESS FOR PREPARING RUBBER-MODIFIED STYRENE RESINS

FIELD OF TECHNOLOGY

This invention relates to a process for preparing rubber-modified styrene resins with high mechanical strength, in particular, with good impact resistance.

BACKGROUND TECHNOLOGY

The preparation of rubber-modified styrene resins of good impact resistance requires an exercise of proper control over the particle diameter and particle diameter distribution of rubber dispersed in the resins.

The rubber-modified styrene resins tend to improve in appearance but suffer a loss in impact resistance as the rubber particle diameter diminishes and the optimal particle diameter is generally said to be in the range from 1 to 5 $\mu$m, preferably 1.5 to 4 $\mu$m.

On the other hand, the impact resistance of rubber-modified styrene resins is closely related to the content of styrene polymers occluded in the rubber particles and is said to improve with the increasing content of the occluded styrene polymers.

It is therefore advantageous for the improvement of the impact strength and other mechanical strengths of rubber-modified styrene resins to increase the rubber particle diameter without adversely affecting the appearance of the resins and, at the same time, to increase the content of styrene polymers occluded in the rubber particles.

The present inventors previously disclosed a process for preparing rubber-modified styrene resins which comprises carrying out preliminary polymerization in two complete mixing type reactors, until before the rubber phase inversion in the first reactor and until after the rubber phase inversion in the second reactor, and completing the polymerization of the effluent from the preliminary polymerization in a plug flow type reactor in Japan Tokkyo Kokai Koho No. 63-118,315 (1988) and proposed to bring the rubber particle diameter and the occluded polystyrene content in an optimal range by controlling the solid content in the aforesaid first reactor at a relatively high level, the solid content in the second reactor at a relatively low level, and the difference of the two solid contents in a specified range.

A process for polymerization is also proposed in Japan Tokkyo Kokai Koho No. 63-118,346 (1988) which measures the viscosity of the effluents from the first and second reactors and controls the ratio of the two viscosities within a minimal range, say, 2 to 3.

The polymerization according to these processes is carried out until immediately before the phase inversion in the first reactor, at a conversion kept as low as possible in the second reactor, and until completion in the following reactor and this mode of operation has proved itself capable of yielding products with a high occluded polystyrene content and markedly improved mechanical strength.

The problem confronting the adoption of a process such as above is, as pointed out in the past, that the rubber particles diminish in diameter after the phase inversion. This phenomenon is more pronounced when a peroxide is added as polymerization initiator for the purpose of increasing the amount of polystyrene captured in rubber during the initial phase of the reaction. The likely explanation is that more graft polymers form between rubber particles and styrene polymers on addition of a peroxide to increase the content of styrene polymers occluded in rubber particles, but the graft polymers thus formed act as surfactant between the rubber particles and the styrene polymer continuous phase to produce a finer dispersion of rubber particles and an excessive reduction in particle diameter.

A process developed as a solution to this problem is based either on decreasing the addition of a polymerization initiator at the start of polymerization to such a level as to allow control of the rubber particle diameter in the range from 1.5 to 4 $\mu$m or on carrying out the polymerization in the complete absence of an initiator. Such a process surely reduces the formation of graft polymers and helps to increase the rubber particle diameter, but it does not increase the content of styrene polymers occluded in the rubber particles, a property of great importance, to a satisfactory level and hence is unable to accomplish the anticipated property improvement.

Another process for increasing the rubber particle diameter is based on addition of a chain transfer agent in large amounts. It also suppresses grafting and increases the particle diameter, but does not bring the content of occluded styrene polymers to a satisfactory level and hence does not bring about satisfactory properties.

An attempt has been made to solve the aforesaid problem by control of the reactor-related factors, namely, to form rubber particles without excessive size reduction by as gentle agitation as possible in the second reactor. In brief, the intention here is to minimize the shear energy imparted to the rubber particles by reducing the speed of rotation of agitator blades attached to the reactor. Reduction in the agitation speed, however, decreases the fluidity of the polymer solution inside the reactor. As a result, the particle diameter distribution broadens excessively even when the average rubber particle diameter is brought into the desired range, leading to insufficient manifestation of the desired property-improving effect and production of low-strength polymers.

The present inventors undertook extensive studies with the objective of promoting the graft reaction in the initial phase of polymerization to increase the content of occluded styrene polymers after the phase inversion and, at the same time, producing polymers having an optimal average particle diameter and an optimal particle diameter distribution of rubber, found the following, and completed this invention.

In a polymerization process wherein a feed containing a polymerization initiator is polymerized preliminarily in two complete mixing type reactors at a conversion of as high as possible in the first reactor and at a conversion of as low as possible in the second reactor and then polymerized mainly in a following reactor with the conversion raised to a specified level, the aforesaid problem can be solved by using rubbers which are commercially unavailable so far and show an extremely high viscosity in styrene solution. More desirable results are obtained by using such rubbers selectively while varying the solution viscosity with the rubber content in the feed.

DISCLOSURE OF THE INVENTION

This invention therefore relates to a process for preparing rubber-modified styrene resins with excellent impact resistance which comprises continuously supplying a feed containing 100 parts by weight of reactants consisting of 98 to 88% by weight of a styrene-based monomer or a mixture thereof with other copolymerizable monomers and 2 to 12% by weight of rubber showing a viscosity of 400 to 2,000 centipoises in a 5% by weight styrene solution at 25° C., 0.01 to 0.2 part by weight of an organic peroxide, and 0 to 30 parts by weight of an inert organic solvent as needed to the first complete mixing type reactor wherein the initial polymerization is allowed to proceed under the condition prevailing prior to the inversion of rubber phase, continuously withdrawing the initial reaction mixture and supplying the mixture to the second complete mixing type reactor wherein the rubber is transformed into particles with the conversion of the monomers in the reactants held at 40% by weight or less, and then raising the conversion in the following reactor to produce rubber-modified styrene resins containing rubber particles with a weight average diameter of 1.5 to 4 μm in the resins. According to the process of this invention, it is desirable that the solid content in the effluent at the outlet of the first complete mixing type reactor is kept at 2 to 2.7 times the content of the rubber in the reactants and that the rubber satisfies the relationship $$1.8 \log SV + \log R > 5.6$$

where SV is the viscosity in centipoise of the rubber in a 5% by weight styrene solution at 25° C. and R is the content in % by weight of the rubber in the reactants.

The process of this invention is thus based in principle on the use of a polymerization initiator for increased formation of occluded styrene resins, on the application of sufficient agitation necessary for maintaining a well-mixed condition and securing uniform distribution in both temperature and particle diameter, and further on the use of rubber of high solution viscosity for control of the rubber particle diameter in a suitable range under the aforesaid conditions.

The rubbers to be used in this invention should show a solution viscosity in the range from 400 to 2,000 centipoises, preferably from 500 to 1,500 centipoises, as determined in styrene at 25° C. and a concentration of 5% by weight (hereinafter referred to as SV). At an SV of less than 400 centipoises and at a rubber content of 12% by weight or less in the reactants, the rubber particle diameter becomes too small for sufficient agitation particularly in the cases where the solid content is to be kept high in the first reactor and the conversion after the rubber phase inversion in the second reactor is to be held low. At an SV in excess of 2,000 centipoises, the rubber becomes less soluble in a styrene-based monomer and the productivity of rubber-modified styrene resins is affected adversely. Processes described in Japan Tokkyo Kokai Koho Nos. 61-143,414 (1986) and 63-162,713 (1988) propose to use polybutadiene with an SV of 200 to 500 centipoises; however, they advocate an SV of 400 centipoises or less as preferable and hence they do not teach at all the technical concept of this invention.

The rubbers useful for this invention include polybutadiene and SBR. In the case of SBR, butadiene-styrene copolymers containing 3 to 20% by weight of bound styrene are preferable.

It is desirable to vary the SV of the rubber with its content in the reactants (R in % by weight) so that the smaller the content R, the higher the SV becomes. The experiments conducted by the present inventors indicate that, at a given R, it is desirable to select rubber with an SV satisfying the following relationship $$1.8 \log SV + \log R > 5.6$$

in order to maintain the average rubber particle diameter at 1.5 μm or more in the intended rubber-modified styrene resins.

The styrene-based monomers to be used in this invention include styrene and substituted styrenes such as α-methylstyrene, p-methylstyrene, and chlorostyrene, applicable singly or as a mixture of two or more, styrene being preferable. The comonomers to be polymerized with such styrene-based monomers include acrylonitrile, maleic anhydride, and methyl methacrylate.

The composition of the reactants containing the aforesaid styrene-based monomer or a mixture thereof with other comonomers and the aforesaid rubber is 98 to 88% by weight, preferably 97 to 90% by weight, of the styrene-based monomers and 2 to 12% by weight, preferably 3 to 10% by weight, of the rubber. The use of less than 2% by weight of the rubber improves the impact resistance not so much as intended by this invention. On the other hand, with rubber used in excess of 12% by weight, the rubber particle diameter can be maintained at 1.5 μm or more without relying on high-SV rubber for one thing and the effect for improving the impact resistance levels off for another.

The process of this invention requires 0.01 to 0.2 part by weight of a polymerization initiator, for example, an organic peroxide such as 1,1-di(tert-butylperoxy)cyclohexane, benzoyl peroxide, and lauroyl peroxide, per 100 parts by weight of the aforesaid reactants. The peroxide helps to increase the formation of graft polymers and the content of styrene polymers occluded in the rubber particles, which in turn contributes to a marked improvement in mechanical strength such as impact strength. Less than 0.01 part by weight of such organic peroxide is not very effective for producing the anticipated effect while more than 0.2 part by weight is not practical as it enhances the rate of polymerization too much.

Moreover, in the process of this invention, an inert organic solvent such as toluene, xylene, and ethylbenzene, either singly or as a mixture of two or more, may be used as needed. The amount of such solvent is 0 to 30 parts by weight, preferably 0 to 25 parts by weight, per 100 parts by weight of the aforesaid reactants. Use in excess of 30 parts by weight is economically disadvantageous as it markedly reduces the rate of polymerization.

It is also allowable to add a chain transfer agent, a mercaptan such as tert-dodecyl mercaptan, in an amount of 0 to 200 ppm, preferably 100 ppm or less, for control of the molecular weight. A chain transfer agent, however, is known to decrease the content of styrene polymers occluded in the rubber particles and lower the mechanical strength of the resins and it should preferably be added in an extremely small amount, if any, or not at all.

In the process of this invention, rubber particles of a specified diameter must be formed by controlling the agitating speed in the second reactor after the rubber phase inversion, to be described later, and the rubber particle diameter in the rubber-modified styrene resins must finally be maintained in the range from 1.5 to 4 μm, preferably from 1.5 to 3 μm, without breaking the rubber particles by exercising proper control over the main polymerization in the following reactor. Rubber particles with a diameter of less than 1.5 μm do not impart sufficient impact strength to the rubber-modified styrene resins while those with a diameter of more than 4 μm lower the toughness.

In the process of this invention, the aforesaid reactants and other materials are fed continuously, either mixed in advance or not mixed in advance, to a polymerization apparatus consisting of the first complete mixing type reactor, the second complete mixing type reactor, and the following reactor connected in series. The first or second complete mixing type reactor may be any reactor as long as it is capable of maintaining its feed in a substantially uniformly mixed condition and, for example, a complete mixing type reactor equipped with agitating blades may be used.

The process of this invention will be explained as applied to bulk polymerization, one of the preferable methods for the preparation of rubber-modified styrene resins.

Rubber specified by this invention is dissolved in a styrene-based monomer, the solution is fed to the first complete mixing type reactor which is kept at a temperature matching the decomposition temperature of a particular polymerization initiator in use, or at 90° to 110° C., and the solution is allowed to polymerize so that the monomer solution of the rubber forms a continuous phase and that of the polymers forms a disperse phase or the solution is kept under the condition prevailing prior to the rubber phase inversion. It is important here to carry out the polymerization until immediately before the rubber phase inversion so that as much styrene polymers as possible become occluded in the rubber solution until then.

It is generally stated, for example, in Japan Tokkyo Kokai Koho No. 63-118,346 (1988) and Japan Tokkyo Koho No. 47-7,343 (1972), that the inversion of rubber phase occurs when the solid content increases to approximately twice the amount of rubber initially added to the polymerization system. It has been proved in the process of this invention that the phase inversion occurs when the solid content becomes approximately 2.7 times the amount of initially added rubber. It is therefore desirable in the process of this invention to carry out the initial polymerization by maintaining the solid content in the effluent at the outlet of the first complete mixing type reactor in the range from 2 to 2.7 times, preferably 2.3 to 2.7 times, more preferably from 2.3 to 2.6 times, the rubber content in the feed and thereby keeping the rubber within the range where it does not undergo the phase inversion nor transforms into particles.

A portion of the initial reaction mixture is continuously withdrawn from the aforesaid first reactor and supplied to the second complete mixing type reactor. In the second reactor in which the polymerization temperature is maintained at 100° to 120° C., the polymerization is continued until a condition prevails where the monomer solution of the rubber forms a disperse phase and the monomer solution of the styrene polymers forms a continuous phase or until after the so-called rubber phase inversion. In the process of this invention, the conversion of the monomer in the reactants after the rubber phase inversion is maintained at 40% by weight or less, preferably in the range from 20 to 30% by weight depending upon the rubber content in the reactants. A conversion of 40% by weight or more at the outlet of the second reactor lowers the gel content, namely the content of styrene polymers occluded in the rubber particles, and makes it difficult to improve properties, in particular elongation, of the resins produced.

The conversion of monomer to be attained varies with the content of rubber in the reactants and it should preferably be controlled in the following manner. The polymerization is carried out so that the conversion is 40% by weight or less and the solid content $S_2$ in the effluent at the outlet is 6 times or less, preferably 5 times or less, the rubber content in the feed. The conversion is raised further by continuing the polymerization in the following reactor with a resultant increase in the content of polystyrene occluded in the rubber particles. This procedure, however, does not apply to the cases where the rubber content in the reactants is low, say on the order of 2 to 3% by weight, because agglomeration of the rubber particles sometimes occurs to make the control of the particle diameter difficult at a solid content of 6 times or less the rubber content.

Agitation during the phase inversion in the second reactor is mandatory for control of the diameter of rubber particles to be dispersed in the resins and it is desirable to have the agitating shear (energy) varied with ease against the polymer solution. In the process of this invention, use of rubber of a high SV or the so-called high-viscosity rubber, selected in consideration of its content in the reactants, makes the viscosity of the rubber solution higher than that of the styrene polymer solution after the phase inversion and this helps to maintain the rubber particle diameter in the intended rubber-modified styrene polymers at 1.5 μm or more even when an agitating speed is adjusted to a level required to maintain a uniform polymerization temperature inside the second reactor.

In the process of this invention, the feed having undergone the preliminary polymerization and the phase inversion in the aforesaid first and second reactors is introduced into the following reactor where the main polymerization takes place and the conversion rises continuously. There is no specific limitation to the following reactor in question and a stirred tank reactor, a tower reactor, or a plug flow reactor may be used, either singly or in combination of a plurality of the same or different type.

A particularly desirable reactor is the one which has an equivalent tank number of 10 or more, preferably 30 or more, in a model for a series of complete mixing tanks and is capable of carrying out polymerization to a desired high conversion. Examples of such reactors are plug flow reactors equipped with agitators and static mixer type plug flow reactors and they may be used singly or in combination. A preferred mode of operation, for example, is to carry out polymerization to a conversion of 25 to 50% in a plug flow reactor equipped with agitators and then to 50 to 90% in a static mixer type plug flow reactor. Control of the conversion in this manner prevents the rubber particles formed in the second reactor from changing markedly in particle diameter during the polymerization in a plug flow reactor, maintains the rubber particle diameter in the resins in the range from 1.5 to 4 μm, and enhances the gel content. When the main polymerization is carried out in a plug flow reactor, it is preferable to add, as a supplement to the initial addition, a small amount of a polymerization initiator, an organic peroxide such as 1,1-di(-tert-butylperoxy) cyclohexane, benzoyl peroxide, and lauroyl peroxide, in order to improve the impact resistance of the product resins.

The feed thus polymerized to a high conversion is stripped of the unchanged monomers, if any, by a known procedure, for example, by devolatilization under heat and reduced pressure, and processed into products of desired shape such as chopped strands.

In the process of this invention which effects the preliminary polymerization in the first and second complete mixing type reactors by keeping the conversion, namely the solid content, relatively high in the first reactor and relatively low in the second reactor, the use of high-SV rubber makes it possible to control the agitation shear energy within a range where the reaction mixture can be maintained in a well-mixed condition, particularly during the phase inversion in the second reactor, helps to produce resins containing rubber particles of a desired diameter in a desired distribution, and furthermore allows optimal control of the rubber particles and gel content in the main polymerization of the preliminary reaction mixture in the following reactor, thus contributing to a futher improvement in properties, particularly elongation.

PREFERRED EMBODIMENTS OF THE INVENTION

This invention will be explained in detail with reference to the accompanying examples and comparative examples.

EXAMPLE 1

A polymerization system was constructed by connecting in series a first reactor A consisting of a complete mixing type reactor equipped with agitating blades and having a volume of approximately 10 l, a second reactor B consisting of a complete mixing type reactor equipped with agitating blades and having a volume of approximately 11 l, a plug flow reactor C equipped with agitating blades and having a volume of 10 l, and a static mixer type plug flow reactor D having a volume of 10 l.

As shown in Table 1, a feed was prepared by mixing 95.8 parts by weight of styrene, 4.2 parts by weight of polybutadiene rubber with an SV of 1,000 centipoises, 25.0 parts by weight of ethylbenzene, and 0.035 part by weight of 1,1-di(tert-butylperoxy)cyclohexane.

The feed was introduced into the reactor A of the polymerization system at a rate of 5 l/hr. and allowed to polymerize under the conditions shown in Table 2. The rubber in the effluent at the outlet of the reactor A was not particulate.

The initial reaction mixture continuously withdrawn from the reactor A was introduced into the reactor B and was allowed to polymerize under the conditions shown in Table 2. The rubber in the effluent at the outlet of the reactor B was particulate.

The reaction mixture withdrawn continuously from the reactor B was then introduced into the reactors C and D in succession and was allowed to polymerize in them with the reaction temperature controlled in such a manner as to provide a gradient increasing from 117° to 160° C. in the direction of flow.

The effluents at the outlets of the reactors A, B, and D were analyzed for their solid contents $S_1$ to $S_3$.

Figure 1:
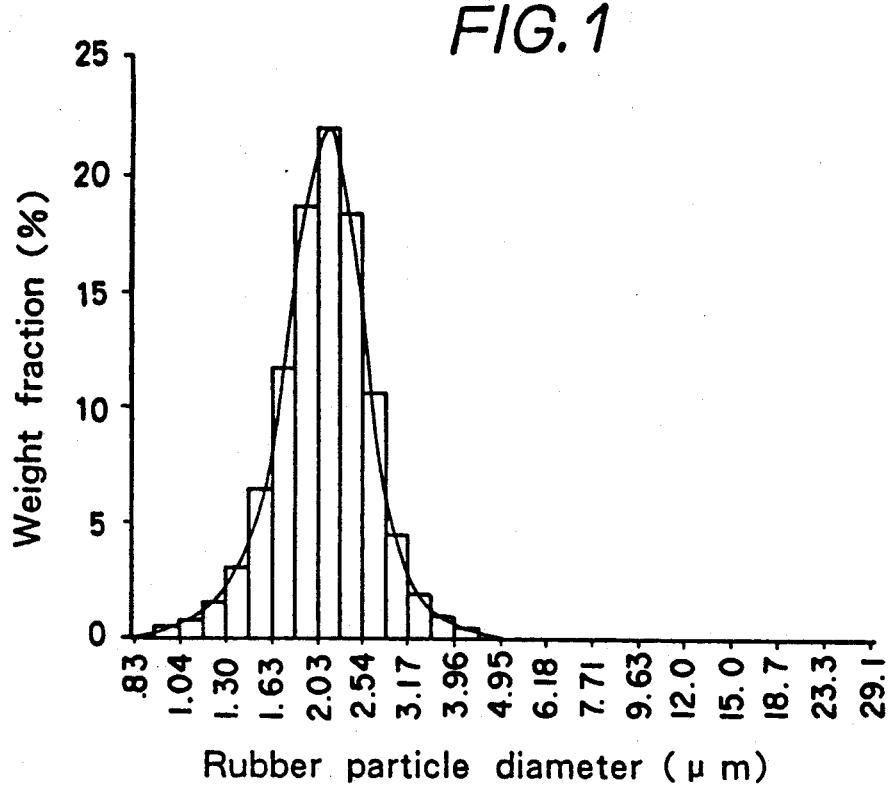
FIG. 1 shows the particle size distribution (weight distribution) of rubber in the product obtained in Experiment 1 and FIG. 2 shows the particle size distribution (weight distribution) of rubber in the product obtained in Comparative Example 6.

The effluent from the reactor D was devolatilized in the usual manner to get rid of the unchanged styrene and the ethylbenzene solvent, meltextruded, cooled, and cut into granules. The product was tested for the rubber particle diameter, occluded polystyrene content, elongation (JIS K 7113 at a test speed of 500 mm/min.), falling weight impact strength (JIS K 7211, a weight with R=¼ inch dropped from a height of 1 m on 30 plate specimens with a thickness of 3 mm conditioned for 24 hrs. or more), and Izod impact strength (JIS K 7110). The results are shown in Table 2. The particle size distribution (weight distribution) of the rubber is shown in FIG. 1.

The solid content of each effluent was determined by taking a specimen on the order of 1 to 2 g., drying it by devolatilization at 200° C. under reduced pressure near vacuum for 30 minutes, and calculating the weight of the residue in %. The diameter of rubber particles was determined on a dispersion of the rubber particles in a dimethylformamide electrolyte with the aid of a COULTER MULTISIZER, a product of COULTER ELECTRONICS INC. The occluded polystyrene content was determined by treating 1 g. of a resin specimen with 40 ml. of a 1:1 mixture of methyl ethyl ketone and acetone, settling the insoluble gels (rubber particles) by a centrifuge, discarding the supernatant liquid, drying the settled insoluble gels to a constant weight, weighing the gels, determining the proportion of gels (gel content), and calculating as follows;

[(wt % gel content)−(wt % rubber content in product resin)]/wt % rubber content in product resin).

EXAMPLES 2-5

Except using polybutadiene of different SV and formulating the feed as shown in Table 1, the polymerization was carried out as in Example 1 under the conditions shown in Table 2. In each example, the rubber was not particulate at the outlet of the reactor A. The properties of the products obtained are shown in Table 2.

COMPARATIVE EXAMPLES 1-6

Except using low-SV polybutadiene and formulating the feed as shown in Table 1, the polymerization was carried out as in Example 1 under the conditions shown in Table 2. In each example, the rubber was not particulate at the outlet of the reactor A. The properties of the products obtained are shown in Table 2.

Figure 2:
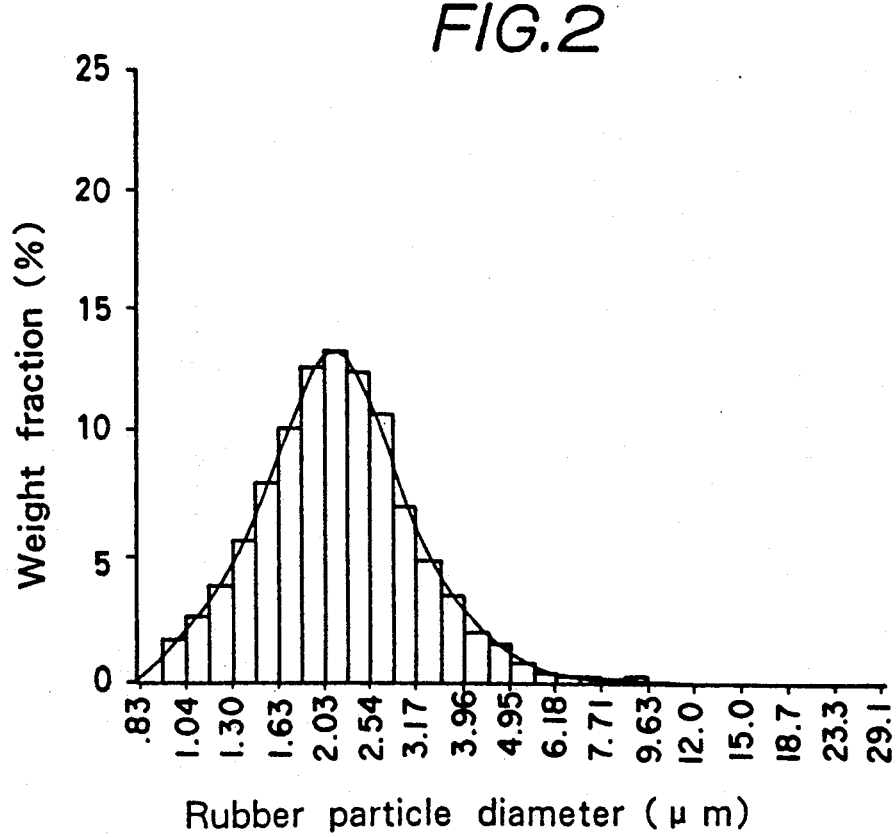

In Comparative Example 6, the temperature in the reactor B was unstable and the particle size distribution (weight distribution) of the rubber became, as shown in FIG. 2, broader than that in Example 1.

TABLE 1

| Composition of polymerization system (in parts by weight) and properties of rubbers | | | | | | | | | | | |
|---|---|---|---|---|---|---|---|---|---|---|---|
| | Example | | | | | Comparative example | | | | | |
| | 1 | 2 | 3 | 4 | 5 | 1 | 2 | 3 | 4 | 5 | 6 |
| Composition S | 95.8 | 94.8 | 93.0 | 90.0 | 97.2 | 95.8 | 94.8 | 90.0 | 94.5 | 94.8 | 94.8 |

TABLE 1-continued

Composition of polymerization system (in parts by weight) and properties of rubbers

| | | Example | | | | | Comparative example | | | | | |
|---|---|---|---|---|---|---|---|---|---|---|---|---|
| | | 1 | 2 | 3 | 4 | 5 | 1 | 2 | 3 | 4 | 5 | 6 |
| of polymerization system | PBR | 4.2 | 5.2 | 7.0 | 10.0 | 2.8 | 4.2 | 5.2 | 10.0 | 5.5 | 5.2 | 5.2 |
| | EB | 25.0 | → | → | → | → | → | → | → | → | → | → |
| | TBPC | 0.035 | → | → | → | → | → | → | → | → | → | → |
| | TDM | — | — | — | — | — | — | — | — | 0.05 | 0.05 | → |
| | SV (cps) | 1000 | 600 | 600 | 600 | 1000 | 350 | 350 | 350 | 87 | 350 | 350 |
| | R (wt %) | 3.4 | 4.2 | 5.6 | 8.0 | 2.2 | 3.4 | 4.2 | 8.0 | 4.4 | 4.2 | 4.2 |
| | 1.8logSV + logR | 5.9 | 5.6 | 5.7 | 5.9 | 5.7 | 5.1 | 5.2 | 5.5 | 4.1 | 5.2 | 5.2 |

S: Styrene, PBR: Polybutadiene rubber, EB: Ethylbenzene, TBPC: 1,1-Di(tert-butylperoxy)cyclohexane, TDM: tert-Dodecyl mercaptan, SV (cps): Viscosity of PBR in a 5 wt % styrene solution at 25° C. (centipoise), R: Content of PBR in reactants (wt %).

TABLE 2

Polymerization conditions and product properties

| Polymerization step | | Example | | | | | Comparative example | | | | | |
|---|---|---|---|---|---|---|---|---|---|---|---|---|
| | | 1 | 2 | 3 | 4 | 5 | 1 | 2 | 3 | 4 | 5 | 6 |
| Reactor A | Polymerization temperature (°C.) | 102 | 104 | 105 | 109 | 95 | 102 | 104 | 109 | 104 | 104 | 104 |
| | Agitating speed (rpm) | 100 | → | → | → | → | → | → | → | → | → | → |
| | $S_1$ (wt %) | 9.0 | 11 | 13 | 16 | 5.5 | 9.0 | 11 | 16 | 11 | 11 | 11 |
| | $S_1$/R | 2.6 | 2.6 | 2.3 | 2.0 | 2.5 | 2.6 | 2.6 | 2.0 | 2.5 | 2.6 | 2.6 |
| Reactor B | Polymerization temperature (°C.) | 107 | 105 | 112 | 114 | 108 | 107 | 105 | 114 | 118 | 105 | 105 |
| | Agitating speed (rpm) | 200 | 180 | 200 | 220 | 160 | 160 | 160 | 160 | 140 | 180 | 100 |
| | $S_2$ (wt %) | 20 | 21 | 24 | 26 | 20 | 20 | 21 | 26 | 28 | 21 | 21 |
| | $S_2$/R | 5.9 | 5.0 | 4.3 | 3.3 | 9.1 | 5.9 | 5.0 | 3.3 | 6.4 | 5.0 | 5.0 |
| | Conversion (%) | 22 | 22 | 25 | 25 | 23 | 22 | 22 | 25 | 31 | 22 | 22 |
| Reactor C-D | Polymerization temperature (inlet - outlet): 117-160° C. in all examples and comparative examples | | | | | | | | | | | |
| | $S_3$ (wt %) | 68 | 69 | 70 | 69 | 70 | 68 | 69 | 69 | 71 | 69 | 69 |
| | Conversion (%) | 84 | 85 | 87 | 85 | 87 | 84 | 85 | 85 | 88 | 85 | 85 |
| Product properties | $D_W$ (μm) | 2.0 | 1.9 | 2.2 | 2.5 | 1.8 | 1.2 | 1.4 | 1.3 | 2.1 | 2.0 | 1.8 |
| | $D_W/D_N$ | 1.18 | 1.25 | 1.20 | 1.24 | 1.18 | 1.21 | 1.30 | 1.31 | 1.36 | 1.25 | 1.40 |
| | Occluded PS content (—) | 2.6 | 2.5 | 2.2 | 1.6 | 3.1 | 1.7 | 1.7 | 1.7 | 1.8 | 1.6 | 2.5 |
| | Tensile elongation (500 mm/min · %) | 17 | 25 | 45 | 55 | 8 | 12 | 13 | 15 | 19 | 17 | 23 |
| | Izod impact strength (Kgfcm/cm) | 7.6 | 9.0 | 11.4 | 13.0 | 5.0 | 4.8 | 6.3 | 8.0 | 8.6 | 8.5 | 8.8 |
| | Falling weight impact strength (Kgf · cm) | 70 | 110 | 230 | 320 | 25 | 35 | 50 | 120 | 60 | 40 | 70 |
| | Rubber content (wt %) | 5.0 | 6.1 | 8.0 | 11.6 | 3.1 | 5.0 | 6.1 | 11.6 | 6.2 | 6.1 | 6.1 |

$S_1$: Solid content at outlet of reactor A,
$S_2$: Solid content at outlet of reactor B,
$S_3$: Solid content at outlet of reactor D,
$D_W$: Weight average rubber particle diameter,
$D_N$: Number average rubber particle diameter,
$D_W/D_N$: Rubber particle diameter distribution,
PS: Polystyrene

Industrial Applicability

Rubbers of high solution viscosity specified by this invention transform into large-diameter particles in the absence or in the minimal presence of a chain transfer agent while occluding more styrene polymers and yield industrially useful rubber-modified polystyrene of excellent impact resistance and other mechanical strength.

What is claimed is:

1. A process for preparing rubber modified styrene resins of excellent impact resistance consisting essentially of supplying continuously 100 parts by weight of reactants consisting of 98 to 88% by weight of a styrene-based monomer or a mixture thereof with other copolymerizable monomers and 2 to 12% by weight of high-viscosity rubber showing a viscosity of 500 to 2,000 centipoises in a 5% by weight styrene solution at 25° C. together with 0.01 to 0.2 part by weight of an organic peroxide and 0 to 30 parts by weight of an inert organic solvent to the first complete mixing type reactor, effecting the initial polymerization under the condition prevailing prior to the rubber phase inversion in said first complete mixing type reactor, then supplying the continuously withdrawn initial reaction mixture to a second complete mixing type reactor, transforming the rubber into particles while holding the conversion of the monomers in the reactants at 40% by weight or less in said second complete mixing type reactor, and raising the conversion in a third, following reactor to yield rubber-modified styrene resins containing the rubber particles with a weight average particle diameter of 1.5 to 4 μm.

2. A process for preparing rubber-modified styrene resins according to claim 1 wherein the solid content in said initial reaction mixture at the outlet of said first complete mixing type reactor is maintained at 2 to 2.7 times the content of said rubber in the reactants.

3. A process for preparing rubber-modified styrene resins according to claim 1 wherein said rubber satisfies the relationship $$1.8 \log SV + \log R > 5.6$$

where SV is the viscosity in centipoise of said rubber in a 5% by weight styrene solution at 25° C. and R is the content in % by weight of said rubber in the reactants.

* * * * *